(12) United States Patent
Kabat

(10) Patent No.: US 12,188,688 B1
(45) Date of Patent: Jan. 7, 2025

(54) CENTER FIRING INDIRECT HEAT EXCHANGER FOR SPRAY DRYING AND CONTROLS FOR SAME

(71) Applicant: Dahmes Stainless, Inc., New London, MN (US)

(72) Inventor: Hans Kabat, Plymouth, MN (US)

(73) Assignee: Dahmes Stainless, Inc., New London, MN (US)

( * ) Notice: Subject to any disclaimer, the term of this patent is extended or adjusted under 35 U.S.C. 154(b) by 436 days.

(21) Appl. No.: 17/749,428

(22) Filed: May 20, 2022

Related U.S. Application Data

(60) Provisional application No. 63/196,083, filed on Jun. 2, 2021.

(51) Int. Cl.
| | |
|---|---|
| F24H 3/08 | (2022.01) |
| B01D 1/00 | (2006.01) |
| B01D 1/18 | (2006.01) |
| F24H 9/00 | (2022.01) |

(52) U.S. Cl.
CPC .......... *F24H 3/087* (2013.01); *B01D 1/0041* (2013.01); *B01D 1/0082* (2013.01); *B01D 1/0094* (2013.01); *B01D 1/18* (2013.01); *F24H 9/0073* (2013.01)

(58) Field of Classification Search
CPC ..... F24H 3/087; F24H 9/0073; B01D 1/0041; B01D 1/0082; B01D 1/0094; B01D 1/18
See application file for complete search history.

(56) References Cited

U.S. PATENT DOCUMENTS

| | | | |
|---|---|---|---|
| 3,520,066 A | 7/1970 | Meade | |
| 3,596,699 A * | 8/1971 | Okada | A23C 1/04 |
| | | | 159/4.01 |
| 3,615,723 A | 10/1971 | Meade | |
| 4,561,192 A * | 12/1985 | Meade | A23C 1/05 |
| | | | 34/368 |
| 9,358,478 B2 | 6/2016 | Dobry | |
| 10,215,444 B2 | 2/2019 | Kopko | |
| 10,300,443 B2 | 5/2019 | Friesen | |
| 2005/0031769 A1 | 2/2005 | Watanabe | |
| 2013/0165371 A1* | 6/2013 | Dobry | B01J 2/04 |
| | | | 514/180 |
| 2013/0193598 A1* | 8/2013 | Friesen | B01J 2/04 |
| | | | 264/13 |
| 2019/0224584 A1* | 7/2019 | Dobry | A61J 3/02 |
| 2019/0329220 A1 | 10/2019 | Watabe | |
| 2020/0182545 A1* | 6/2020 | Downey | A61K 9/16 |

* cited by examiner

*Primary Examiner* — Alfred Basichas
(74) *Attorney, Agent, or Firm* — Gronholm Patent Services

(57) ABSTRACT

This disclosure relates to an improvement over the prior art by providing an improved, "indirect heater" configuration, which is particularly suitable when the downstream spray drying process requires low to no NOx added to the dried product, which may be the case when using traditional, direct-fired gas burners. Various controls are providing which provide improved performance and efficiency.

19 Claims, 15 Drawing Sheets

Figure 3:
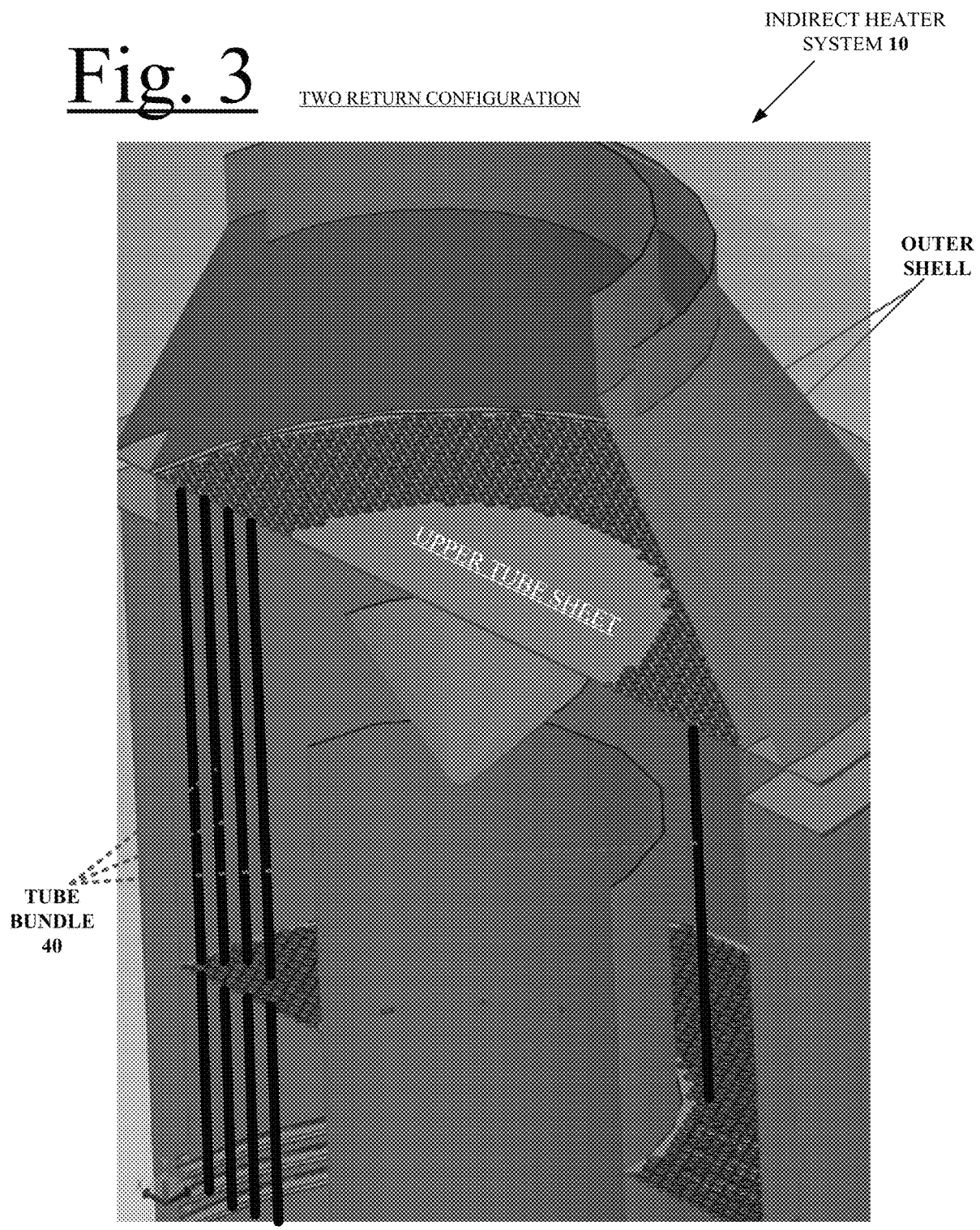
Figure 4:
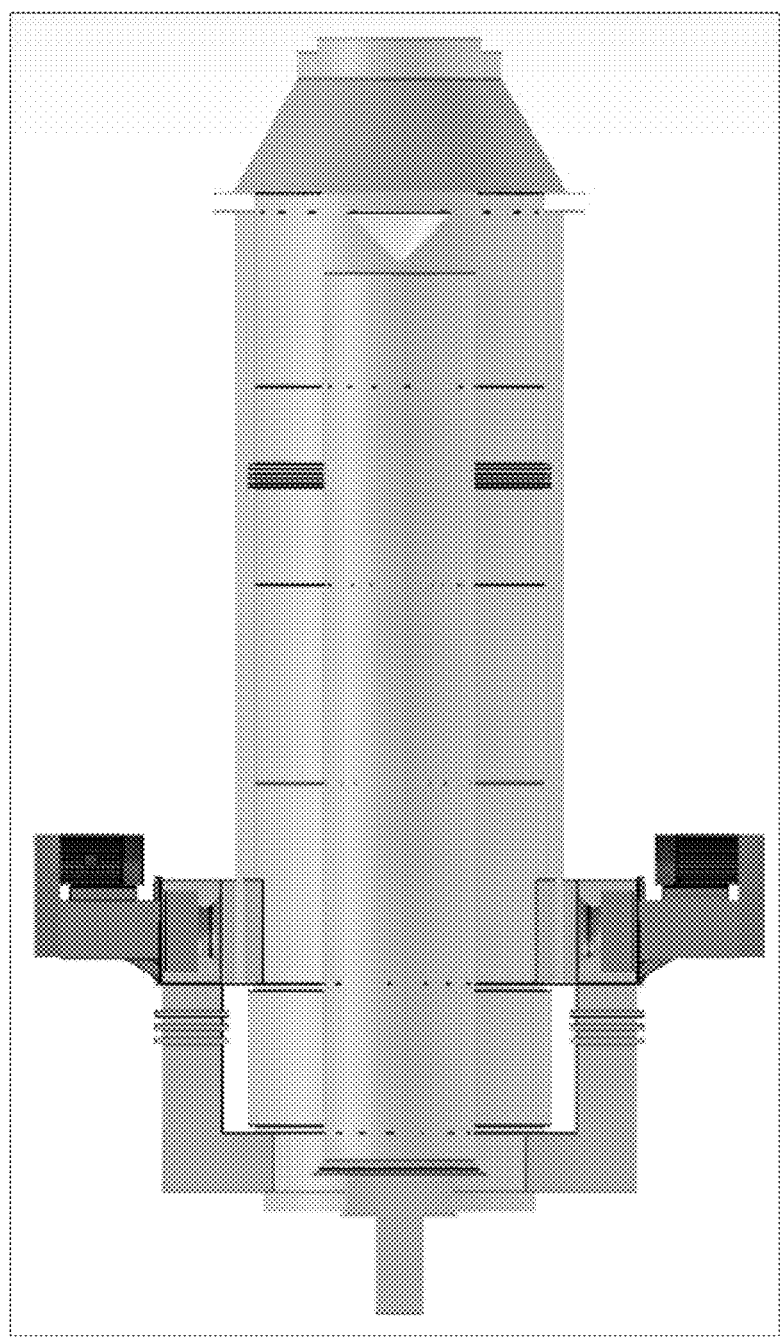
Figure 5:
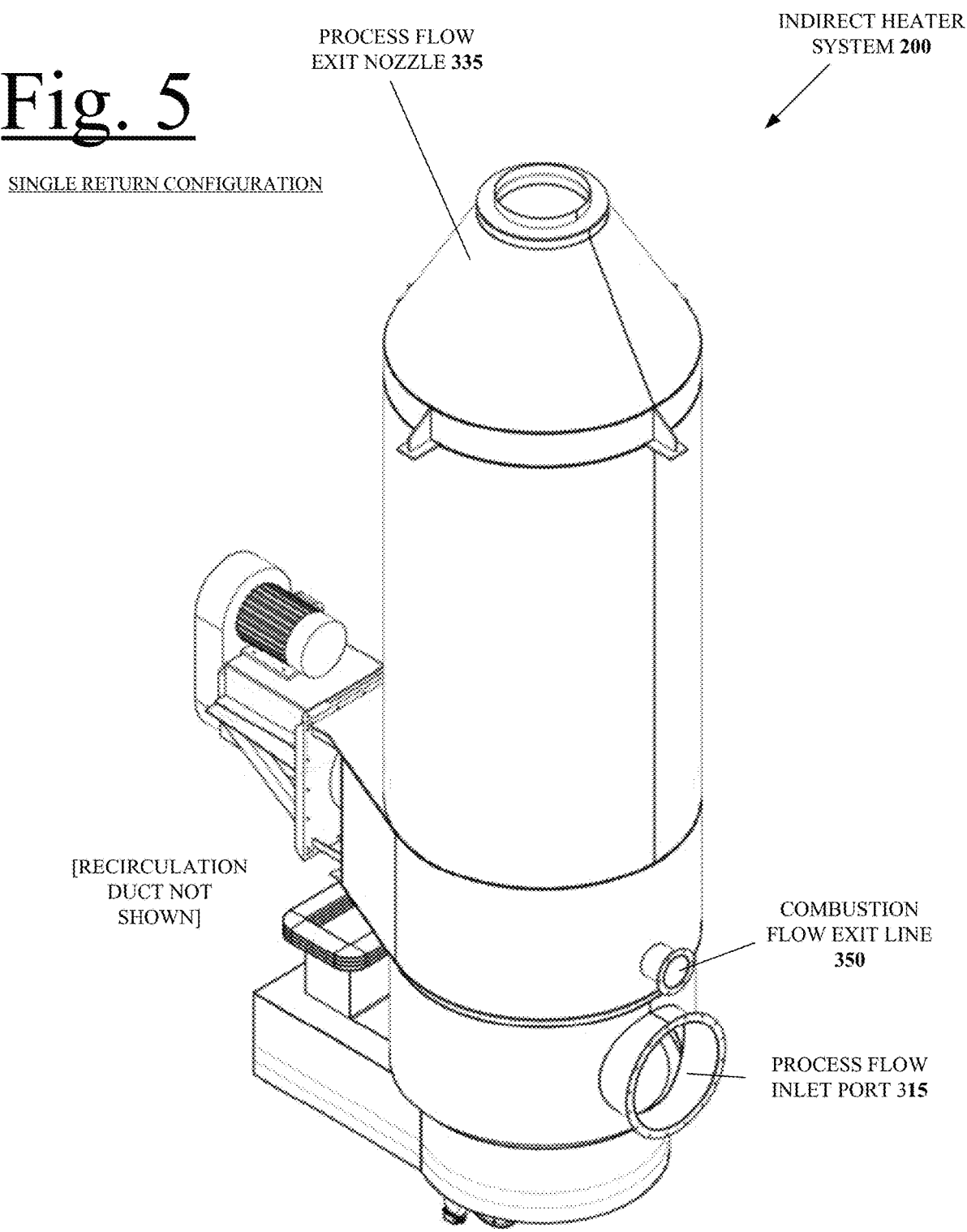
Figure 6:
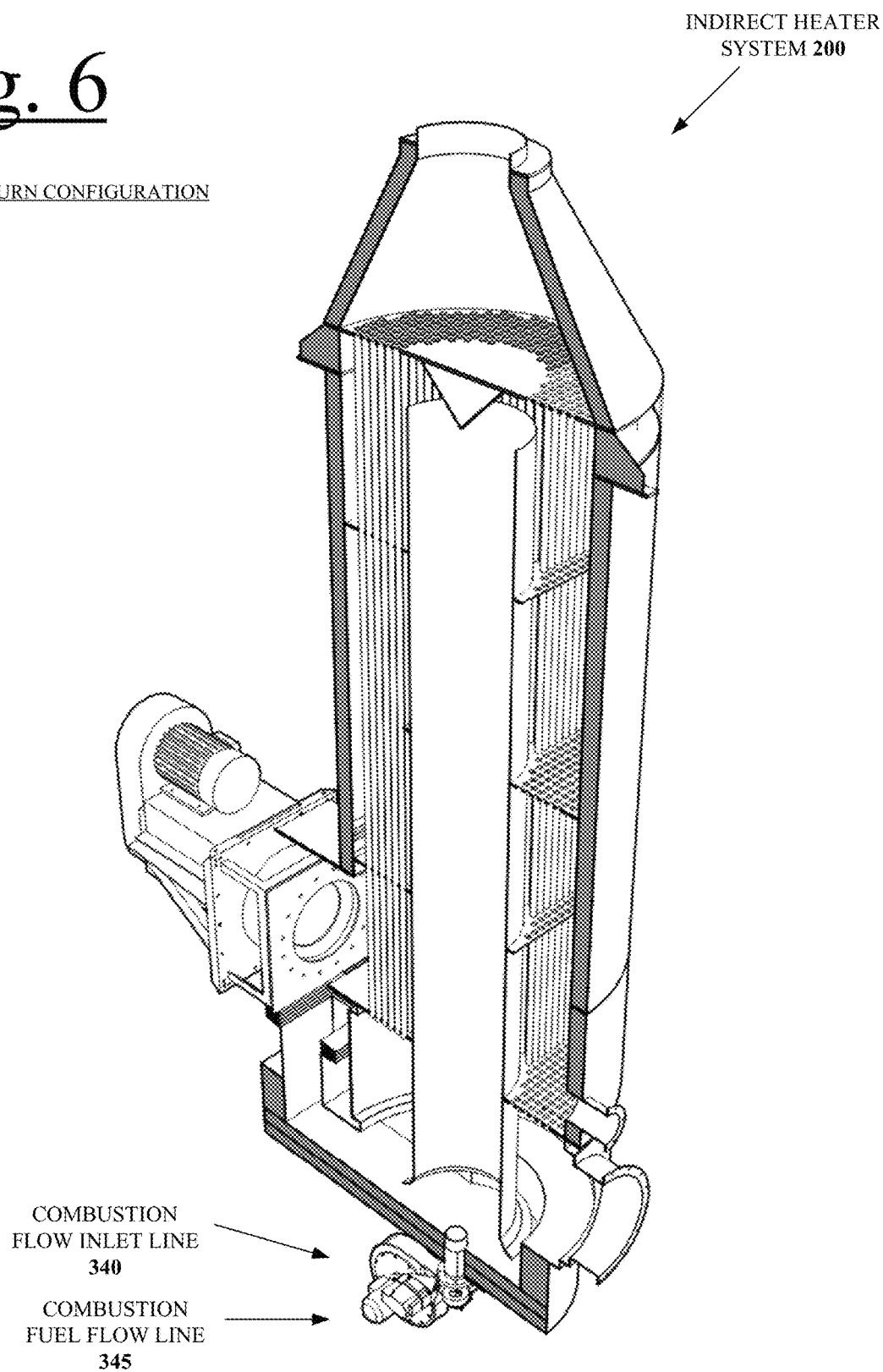
Figure 7:
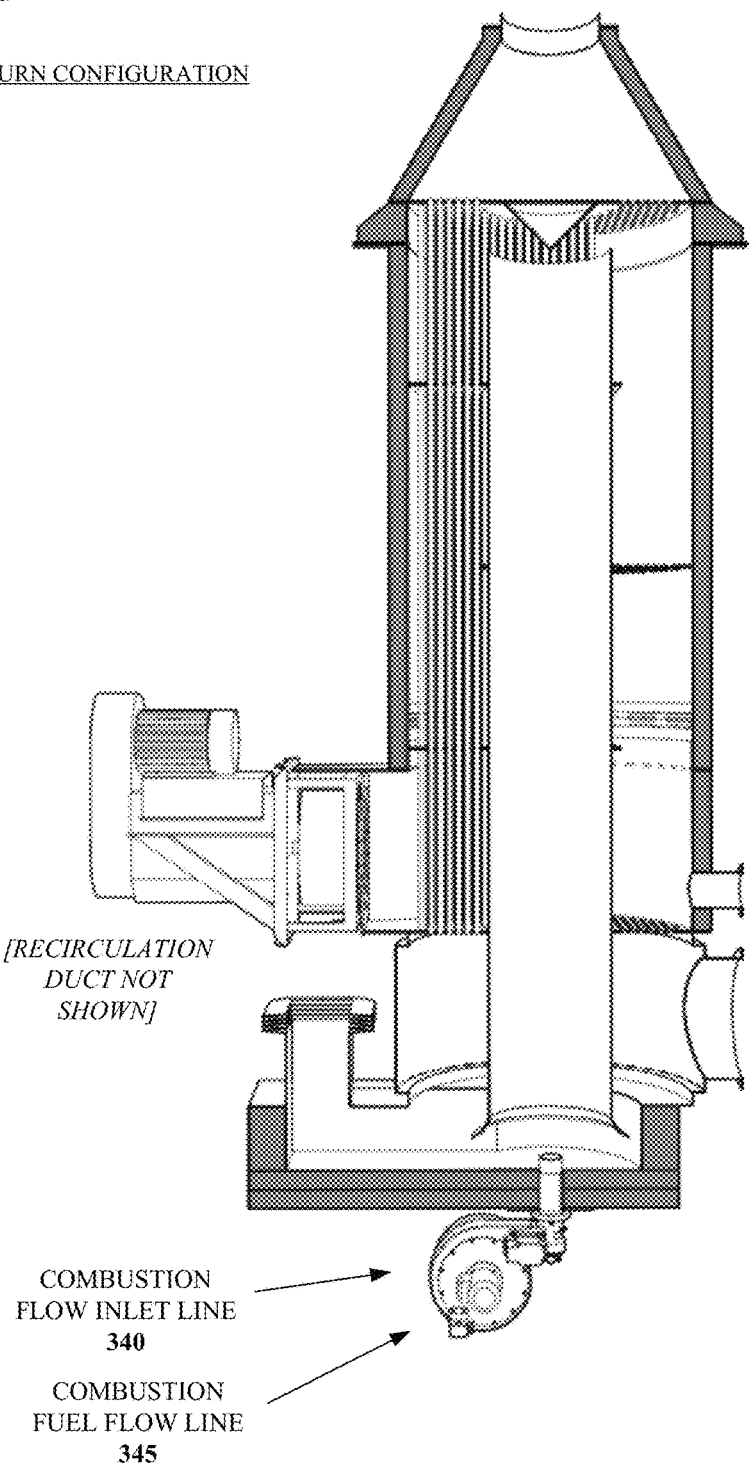
Figure 8:
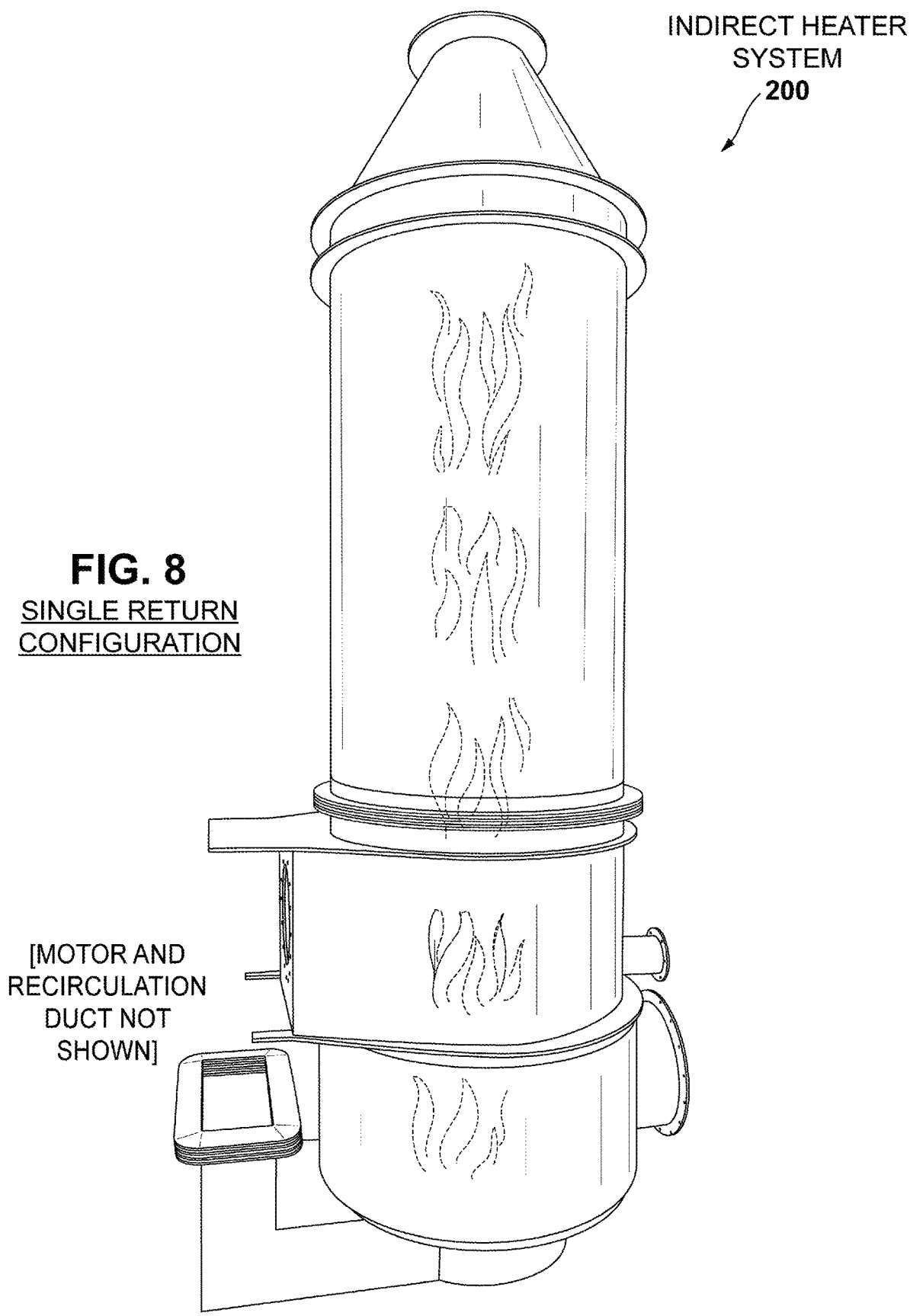
Figure 9:
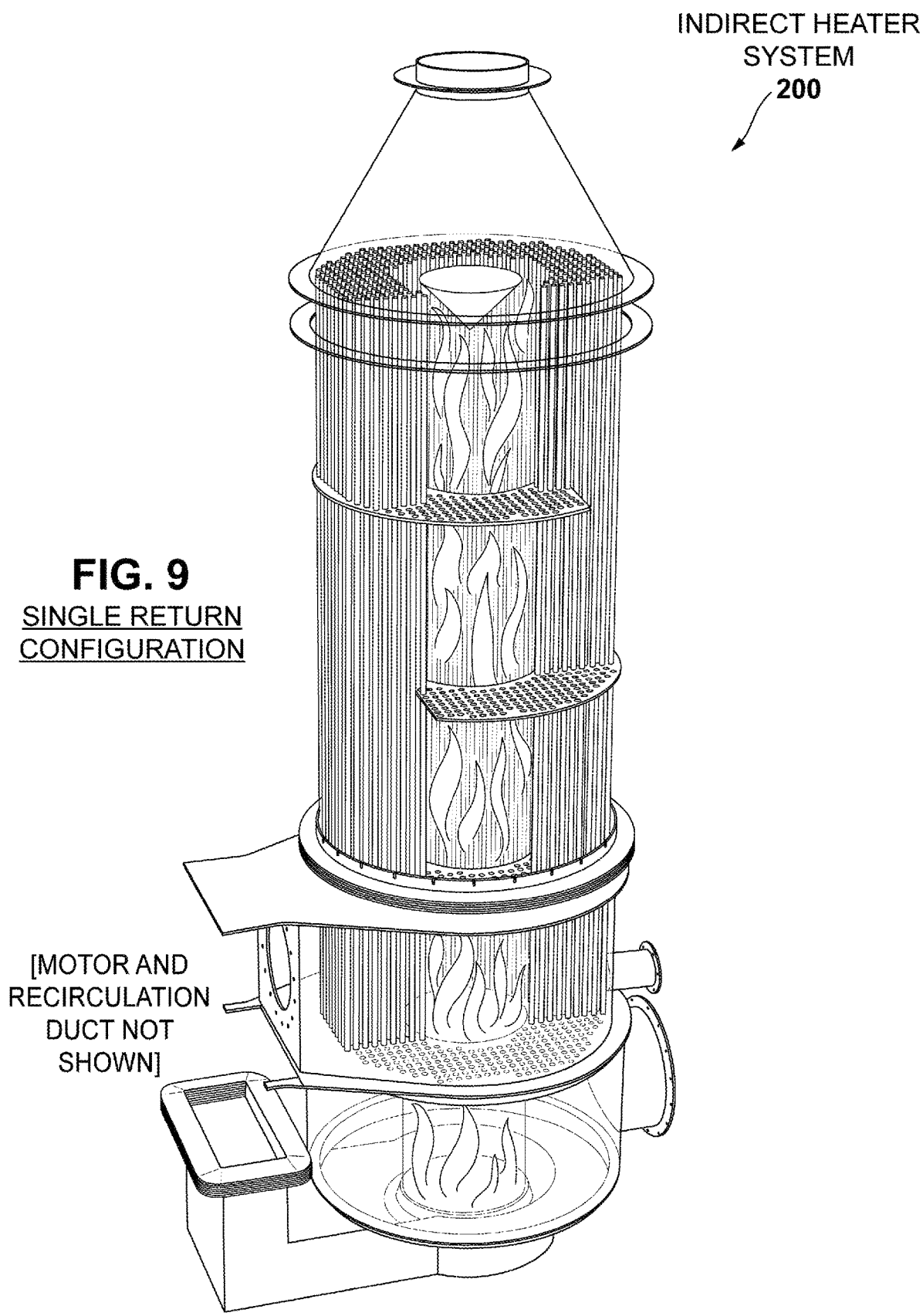
Figure 10:
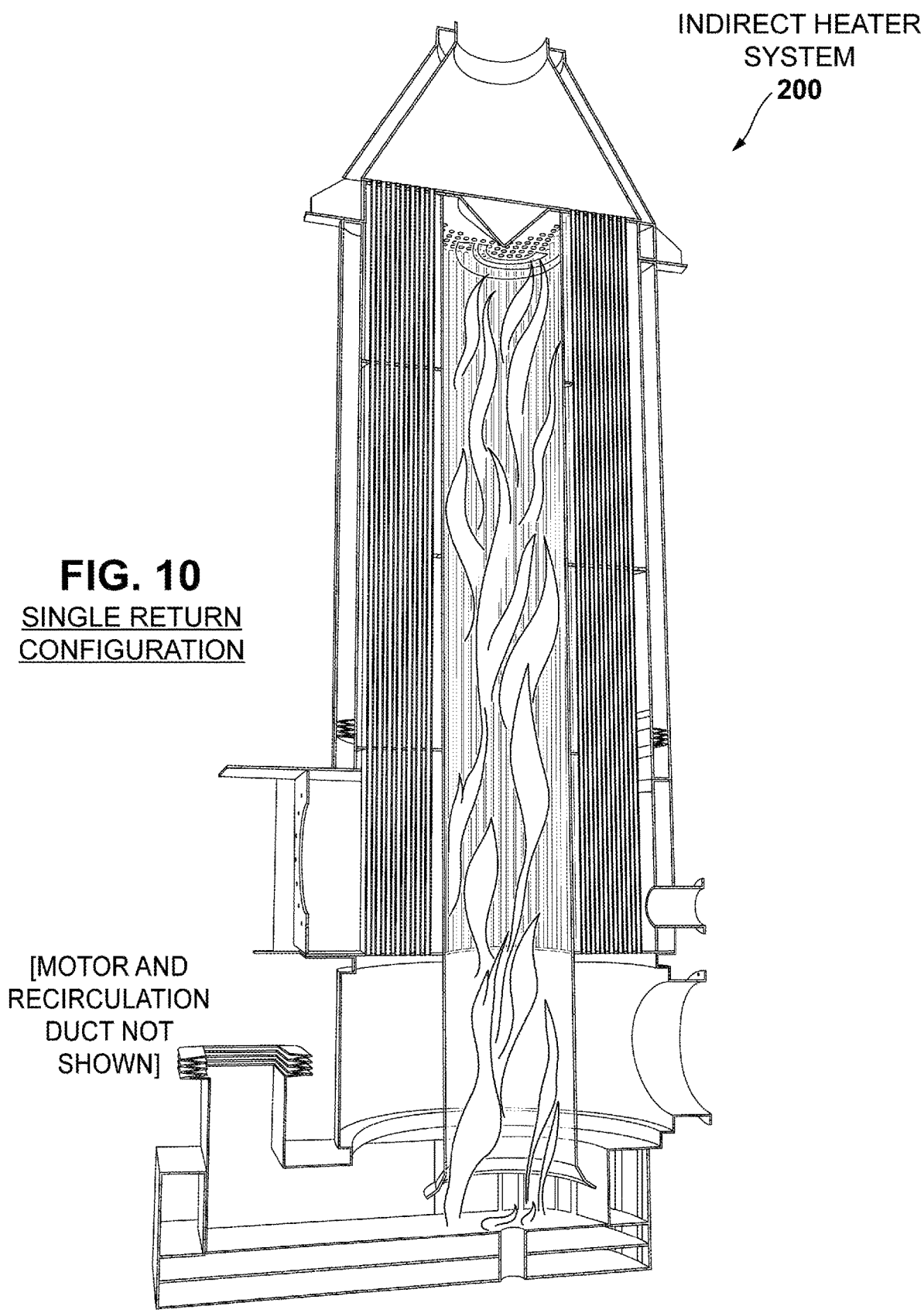
Figure 11:
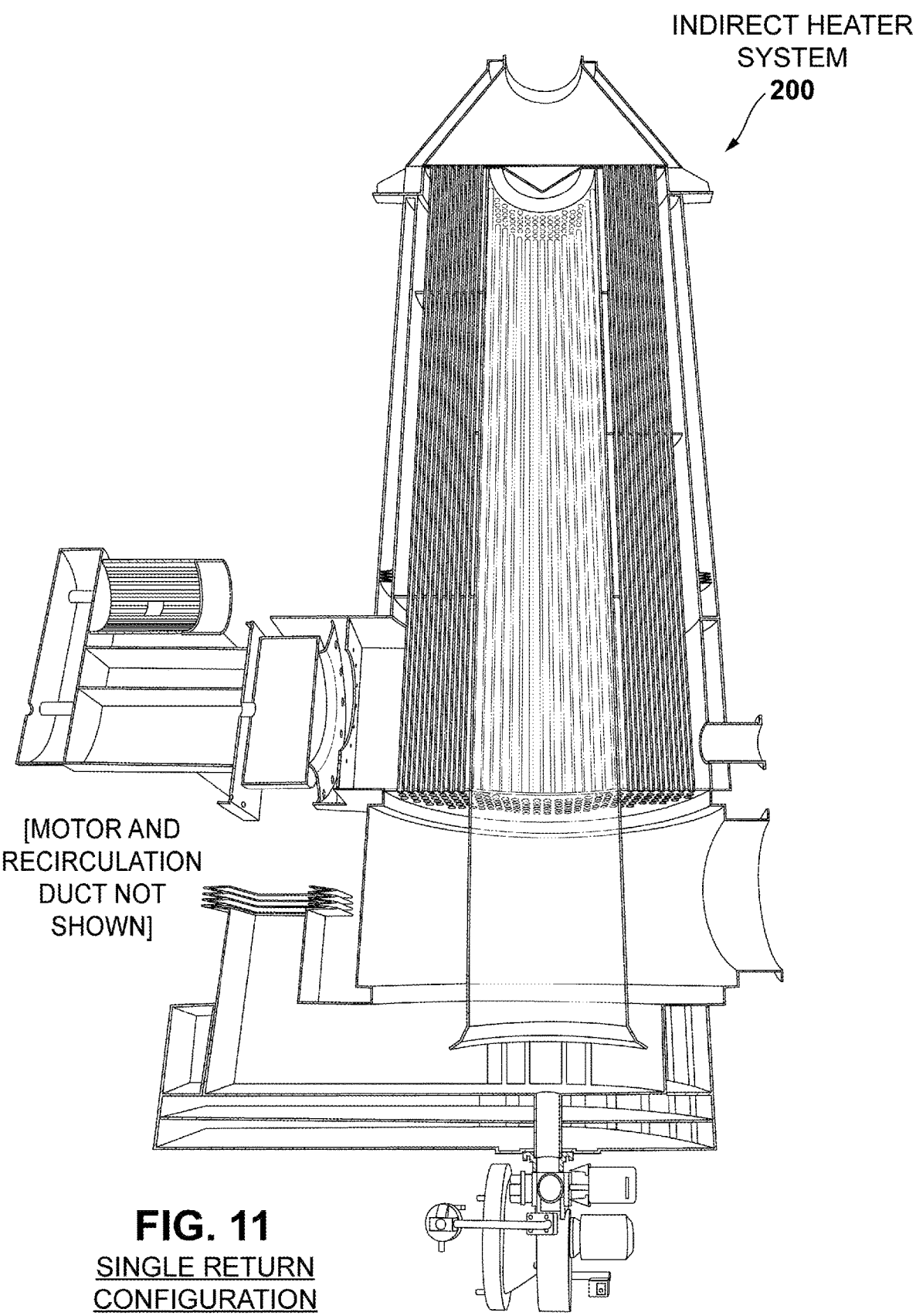
Figure 12:
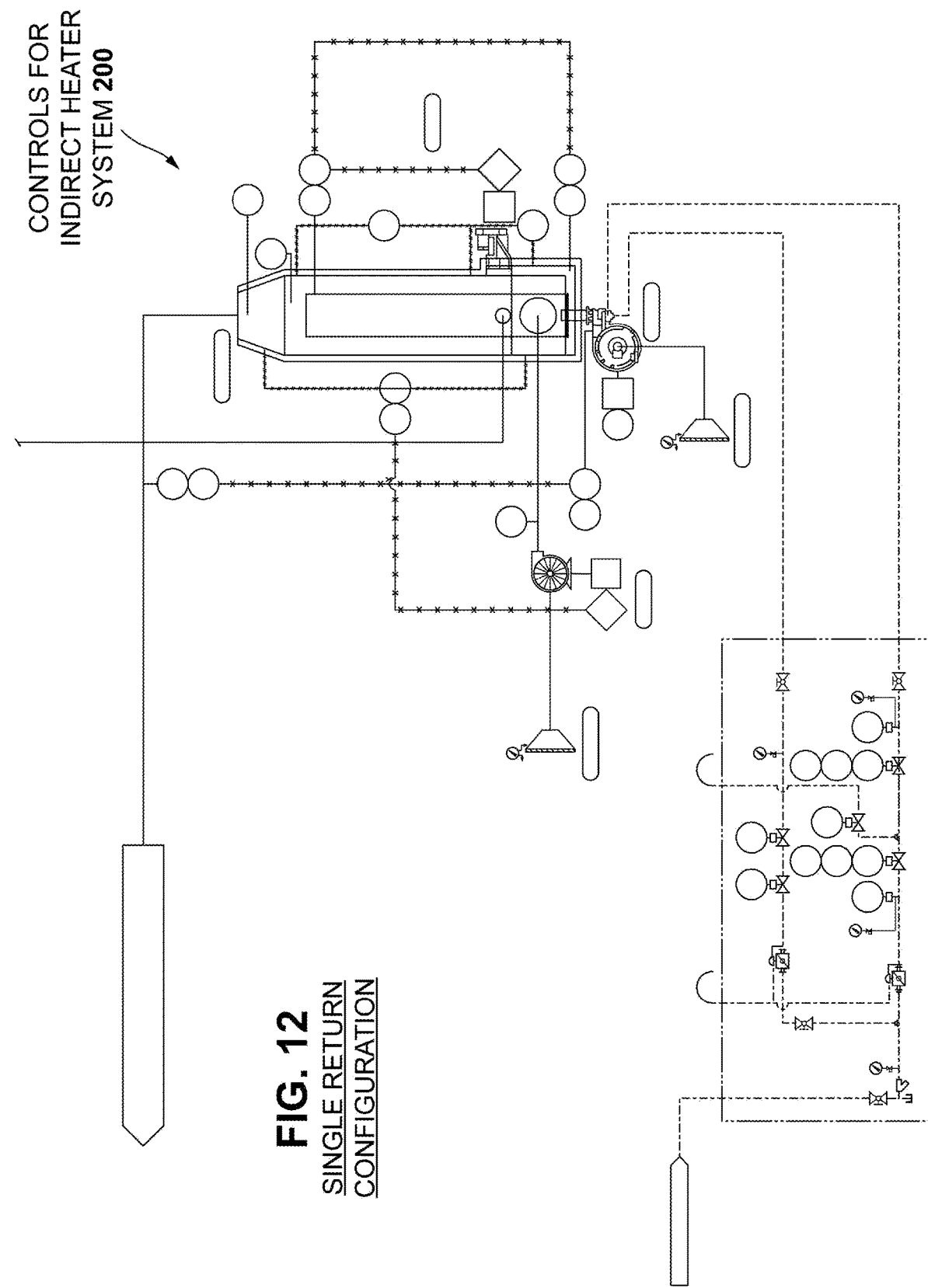

Fig. 3 — TWO RETURN CONFIGURATION

TWO RETURN CONFIGURATION

INDIRECT HEATER SYSTEM 10

SINGLE RETURN CONFIGURATION

SINGLE RETURN CONFIGURATION

INDIRECT HEATER SYSTEM 200

[RECIRCULATION DUCT NOT SHOWN]

COMBUSTION FLOW INLET LINE 340

COMBUSTION FUEL FLOW LINE 345

SINGLE RETURN
CONFIGURATION

SINGLE RETURN CONFIGURATION

INDIRECT HEATER SYSTEM 200

[MOTOR AND RECIRCULATION DUCT NOT SHOWN]

SINGLE RETURN CONFIGURATION

SINGLE RETURN CONFIGURATION

SINGLE RETURN CONFIGURATION

CONTROLS FOR INDIRECT HEATER SYSTEM 200

CENTER FIRING INDIRECT HEAT EXCHANGER FOR SPRAY DRYING AND CONTROLS FOR SAME

CROSS REFERENCE TO RELATED APPLICATION

This application claims priority to and the benefit of U.S. Provisional Application No. 63/196,083, filed Jun. 2, 2021, entitled "CENTER FIRING INDIRECT HEAT EXCHANGER AND CONTROLS FOR SAME" This application are incorporated herein in its entirety.

FIELD

This disclosure relates to air heaters for use in downstream spray drying processes.

SUMMARY

This section provides some introduction to various matters relating to the invention mentioned herein, but it should be understood that this should not be construed as prior art to the invention; certain materials may be included, referenced, or alluded to in this section that may be inventions of the inventors noted herein. This section is simply included to include some introduction for the sake of the reader, some of which may be background to the invention, and some which is not.

Spray drying is a method of producing a dry powder from a liquid or slurry by rapidly drying with a hot gas. This is the preferred method of drying of many thermally-sensitive materials such as foods and pharmaceuticals.

A spray dryer is a device for drying, which uses a spray of material to be dried. Such a dryer mixes a heated gas with an atomized liquid stream within a drying chamber to accomplish evaporation of water out of the spray of material, to produce a flowable dry powder having a desired particle size.

Such spray dryers require a continuous upstream source of heated gas.

The present invention provides an improvement over the prior art by providing an improved, "indirect heater" configuration, which is particularly suitable when the downstream spray drying process requires low to no NOx added to the dried product, which may be the case when using traditional, direct-fired gas burners.

The present inventions include a shell and tube design with a center supply duct and a recirculatory path on the shell side of the process. The primary advantages to such a configuration versus existing available options include: 1) cleanability, 2) ease of Inspection, 3) reduction in ductwork, 4) robust cylindrical design, and 5) fit in general arrangements.

These and other aspects will become readily apparent upon further review of the following specification and drawings. Other objects, features, and advantages of the present inventions will become apparent upon reading the following detailed description of the preferred embodiment of the invention when taken in conjunction with the drawing and the appended claims.

BRIEF DESCRIPTION OF THE DRAWINGS

FIG. 1 is an illustrative view of the indirect heater system 10.

FIG. 2 is another illustrative view of the indirect heater system 10.

FIG. 3 is a view showing the location of tubes in the tube bundle 40. This shows the outer shell, being of double wall construction.

FIG. 4 is another illustrative view of the indirect heater system 10.

FIG. 5 is an illustrative view of a indirect heater system 200, which includes a single recirculation duct, as opposed to the two used in system 10.

FIG. 6 is an illustrative view of the indirect heater system 200, including a cross sectional feature.

FIG. 7 is an illustrative side plan view of the indirect heater system 200, including a cross sectional feature.

FIGS. 8-11 are further illustrative views of the indirect heater system 200.

FIG. 12 is an overall schematic for controls for the indirect heater system 200.

FIG. 13 is an overall schematic for controls for the indirect heater system 200.

FIG. 14 is an overall schematic for controls for the indirect heater system 200.

FIG. 14 is a natural gas train configuration used to supply gas to the burner.

FIG. 15 is an illustration of the Control Loop 3.

DETAILED DESCRIPTION

Introduction

The present invention now will be described more fully hereinafter with reference to the accompanying drawings, in which some, but not all embodiments of the inventions are shown. This invention may be embodied in many different forms and should not be construed as limited to the embodiments set forth herein; rather, these embodiments are provided so that this disclosure will satisfy applicable legal requirements. Like numbers refer to like elements throughout.

Reference is now made to the figures, in which like elements indicate like elements throughout the several views.

ELEMENT LIST

Here is a list of the various elements:

5 Process Air Flow
7 Combustion Air Flow
10 Indirect Heater System (first embodiment)
20 Outer shell
30 Center Fire Tube
40 Tube bundle
50 Recirculation Fans
60 Combustion Air Fan
70 Burner
80 Return ducting
90 Top Tube Sheet Assembly
  92 conical portion
100 Bottom Tube Sheet
110 Process flow inlet line
115 Process flow inlet port
120 Process flow inlet fan
130 Process flow exit line
135 Process flow exit nozzle
140 Combustion flow inlet line
145 Combustion fuel flow line
150 Combustion flow exit line 155 Combustion flow exit port
160 drying system
200 Indirect Heater System (second embodiment)
220 Outer shell
230 Center Fire Tube
240 Tube bundle
250 Recirculation Fans
260 Combustion Air Fan
270 Burner
280 Return ducting
290 Top Tube Sheet Assembly
  92 conical portion
300 Bottom Tube Sheet
310 Process flow inlet line
315 Process flow inlet port
320 Process flow inlet fan
330 Process flow exit line
335 Process flow exit nozzle
340 Combustion flow inlet line
345 Combustion fuel flow line
350 Combustion flow exit line
  355 Combustion flow exit port
360 drying system

DETAILED DISCUSSION

Basic Operation and Construction

Figure 1:
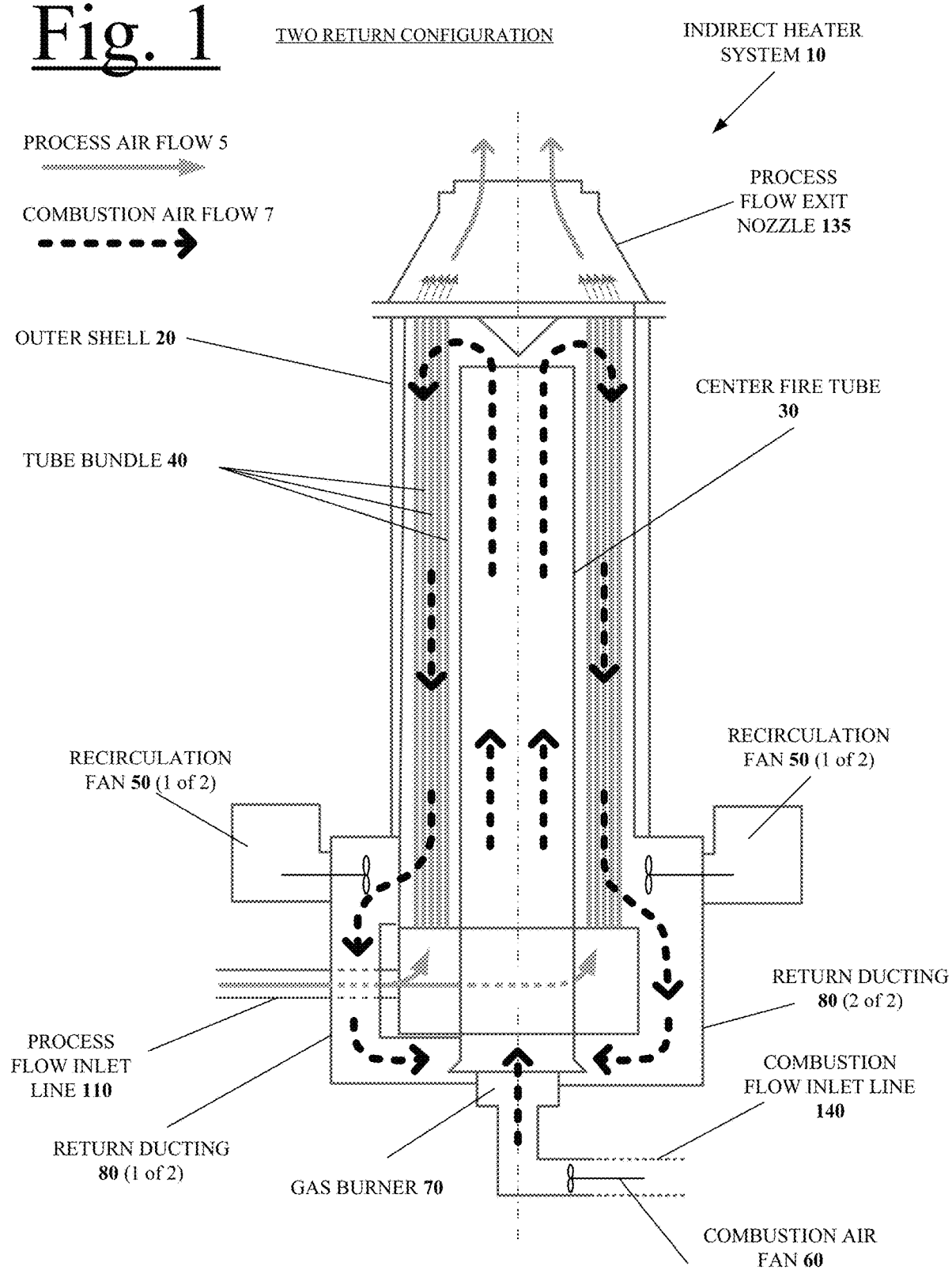

Reference is now made to FIG. 1, which is an illustrative description of an overview and summary of one aspect of the present inventions.

The indirect heater system 10 according to one aspect of the present invention is to be used as the primary heating apparatus for process air flow on various downstream drying systems. It is primarily to be used in instances where the process requires low to no NOx added to the product-All NOx leaves with the flue gas, the process (product contact) air is completely free of all products of combustion, in contrast to traditional, direct-fired gas burners. The primary advantages to the Dahmes Indirect Heater vs existing available options are: 1) Cleanability, 2) Ease of Inspection, 3) Reduction in ductwork, 4) Robust cylindrical design, and 5) fit in general arrangements.

The product has two air-flows: A) process air flow, which is generally filtered exterior air to be heated and used as the media to carry water vapor away from the product in the indirect heater system; and B) combustion air flow, which is filtered air heated by a direct-fired natural gas burner, used to heat the process air flow, and then exhausted to atmosphere.

Combustion air flow enters the burner at the bottom of the unit, continues up in the center tube, is deflected back by the upper cone and headwall (which also supports the upper ends of the tube bundle). The combustion air flow then continues to pass downwardly through an outer annular sleeve, defined on the inside by the center tube and the outside by the exterior cylindrical wall of the unit (which is double-walled). It is in this outer annular sleeve that "indirect" heat transfer primarily occurs between the combustion air flow on the shell side outside of the tubes and the cooler process air flow inside the tubes. The heated combustion air flow then moves down to the lower tubesheet, and is exhausted annularly from the annular sleeve, to then be either partially recirculated or completely removed from the system.

The process air initially enters the indirect dryer enters into a lower plenum chamber defined on its upper side by the lower tubesheet. Process air then is directed into the tubes and is heated tube side as it flows upwardly, exiting the tubes at the upper tubesheet, and is the directed further upward for use.

Overall Construction

The indirect heater system 10 includes the following components:
Outer Shell 20
Center fire tube 30
Tube bundle 40
Recirculation fans 50 (2)
Combustion Air Fan 60
Gas burner 70
Return ducting 80
Top tube sheet assembly 90
Process flow inlet line 110
Process flow inlet port 115
Process flow inlet fan 120
Combustion flow exit line 130
Process flow exit nozzle 135
Combustion flow exit nozzle 135
Combustion flow inlet line 140
Combustion fuel flow line 145
Combustion flow exit line 150
Combustion flow exit port 155

General Operation and Air Flows

As noted above, and now generally referencing FIG. 1, the system has two air-flows: A) process air flow 5, which is generally filtered exterior air to be heated and used as the media to carry water vapor away from the product in the downstream dryer 200; and B) combustion air flow 7, which is filtered air heated by a direct-fired natural gas burner 70, used to heat the process air flow 5, and then exhausted to atmosphere.

The two air flows 5, 7, interact in a modified shell and tube heat exchanger as the method of heating the process air flow 5. The combustion air flow 7 is filtered, blown with a combustion air fan 60 into the direct fired gas burner 70, such that the combustion air flow 7 enters the center fire tube 30 and runs its entire length. It should be understood that in the embodiments shown, orientation of the primary longitudinal axis of the device is shown as vertical. However, it can also be used in a horizontal configuration.

At the upper end of the center fire tube 30, the combustion air flow 7 reflects off the conical portion 92 of the underside of the top tube-sheet assembly 90, then returns in an opposite direction to heat the outside of the tube bundle 40. This is done within an annular passageway defined on the inside by the center fire tube 30, on the outside by the outer shell 20.

At this point the combustion air flow 7 is split into two paths—an exhaust path, and a recirculated path. In the former, air flow exits the indirect heater system 10 via a combustion flow exit line 150 (see now also FIG. 2); in the latter, air flow is recirculated into the lower end of the center fire tube 30 via the use of two sets of return ducting 80.

Figure 2:
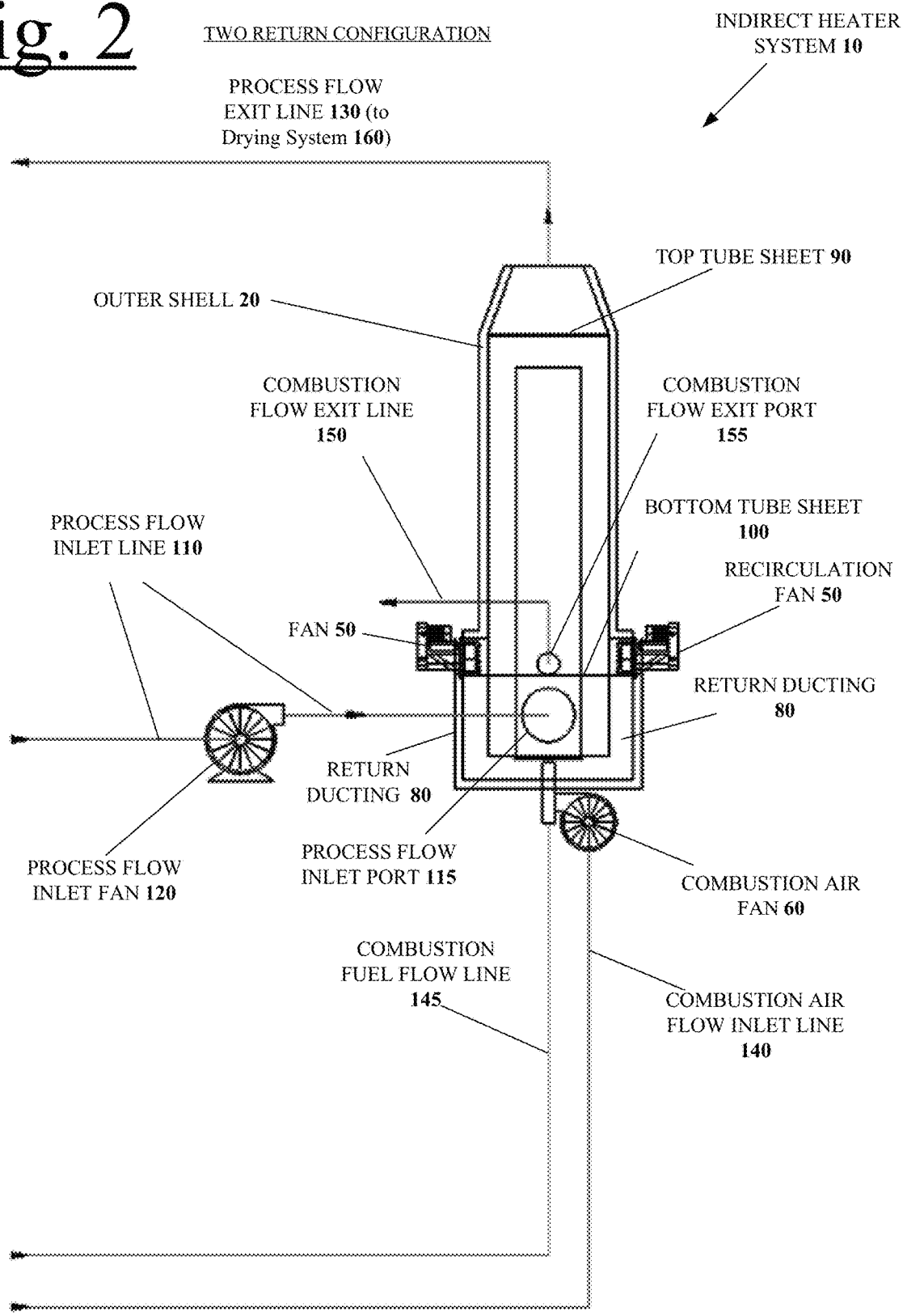

Reference is now also made to FIG. 2, which shows the combustion flow exit port 155, which is in the side of the outer shell 20 of the indirect heater system 10.

Recirculated combustion air flow is pulled from the bottom of the outer shell into one of two (2) recirculation fans 50, and is recirculated into the process air flow 5 by the use of two sets of return ducting 80, and then exhausted to atmosphere based on the supply of new combustion air.

The process air flow 5 is pulled from outside atmospheric air into the indirect heater system 10 via process flow inlet fan 120 (see FIG. 2). It enters via process flow inlet line 120 at the underside of the Bottom Tube-Sheet 100, passes through the inside of the tube bundle 40 where it is heated, exits the indirect heater 10 and enters the drying system ZZ further downstream.

Control

The indirect heater system 10 is operated to deliver a specific rate of process air flow 5 at a specific outlet temperature to reach a desired water evaporation rate in the drying system 160. This likewise applied to the indirect heater system 200 which is similar but includes only one recirculation duct.

The indirect heater system 10 (or 200) is equipped with three control devices to regulate process airflow, control process air outlet temperature, and to optimize efficiency by controlling the combustion recirculation temperatures.

There are three main components of a control loop.

Setpoint (SP), value that the controller is controlling to.

Process Value (PV), actual measured value in the process.
   This is an input to the controller like a temperature transmitter, differential transmitter, pressure transmitter Controller Output (CO) that outputs a signal to a motor speed controller/variable frequency drive, valve positioner, or remote setpoint (SP).

There are three control loops associated with the indirect heater.

Control Loop 1—Control of Process Airflow

The process air flow 5 is calculated based on a pressure differential measured across the inside of the tube bundle 40. Process air inlet temperature and process air outlet temperature is used to determine the average air density. Average air density and pressure drop is used to determine the process air flow through the Indirect Heater 10.

The process air flow 5 inlet temperature and outlet temperature are measured with temperature transmitters which are located at Process Flow Inlet Line 110 and Process Flow Exit Nozzle 135, respectively, in FIG. 1.

Process airflow controller labeled FIC-170.008 controls the process airflow through the indirect heaters. A setpoint (SP) is manually entered into the controller by an operator. The unit for the setpoint is ACFM (actual cubic feet per minute) of process airflow. Differential pressure transmitter DPT-170.008 provides the process value (PV) for the controller. This is the differential pressure across the inside of the tube bundle. The controller uses the differential value along with known prior art air density and the dynamic pressure formulae to calculate actual airflow. The controller compares the actual airflow value against the setpoint value and varies the controller output (CO) accordingly. The variable frequency drive VFD-200.001 is the controller output. Such a control loop allows for variation of the speed of the motor 200.001, which also known as the "process flow inlet fan 120" in FIG. 2. Thus the control loop tends to vary the speed of the fan in a manner suitable to provide a desired ACFM (actual cubic feet per minute) of process airflow.

Control Loop 2—Control of Process Air Flow Outlet Temperature

The process air flow 5 outlet temperature is monitored and adjusted by modulating the fire rate of the gas burner 70, which is measured on the outside of the tube bundle 40 generally at the process flow exit. The "fire rate" is a value for the overall gas burner as a unit.

Burner temperature controller TIC-170.002 controls the fire rate of the burner and thus the exiting temperature of the process air. A setpoint (SP) is manually entered into the controller by an operator. The unit for the setpoint is OF of process air leaving the indirect heater. The exiting process air temperature range is typically 300° F.-550° F. for spray drying.

Exiting process air temperature transmitter TT-170.002 provides the process value (PV) for the controller. The controller compares the actual air temperature value against the setpoint value and varies the controller output (CO) accordingly. The burner temperature control valve TCV-170.034 is the controller output. Such a control loop thus controls the exiting temperature of the process air by variation of the burner temperature control. As the speed of the fan 60 is variable, so is the fire rate of the gas burner 70 likewise variable.

Said another way, the fire rate of the burner assembly is regulated by a temperature control valve that modulates the combustion airflow (via air damper) as well as natural gas flow (via gas valving) going into the indirect heater. This corresponds to the amount of heat required by the process air.

Control Loop 3—Control of Recirculation Fan Speed

The recirculation fan 50 is run at full speed when the indirect heater 10 is at maximum heating rate, where full recirculation airflow through the center fire tube 30 and outside of the tubes is required to optimize the heat transfer rate. As the desired temperature of the process air exiting the indirect heater 10 is turned down by operating personnel to adapt to a particular drying need, this control process controls the recirculation fan 50 speed.

The recirculation fan 50 speed is controlled using a cascading loop controller to maintain both a maximum temperature at the discharge of the center fire tube 30 and a minimum temperature at the return ducting 80, to prevent condensing of the flue gases. This reduces the energy required to run the recirculation fan 50 and reduces the temperature and heat loss from the exiting combustion air flow 7.

Combustion (shell side) air temperature controller TIC-170.003 controls the maximum temperature of the combustion air by controlling the recirculation fan speed, to optimize indirect heater efficiency. This controller requires a remote temperature setpoint (SP) from the controller output (CO) of the minimum combustion (shell side) air temperature controller TIC-170.004, as discussed later. This is commonly referred to as a cascading loop and controlling the recirculation fan speed in this manner is unique.

Combustion air exiting the fire tube is measured by temperature transmitter TT-170.003, which provides the process value (PV) for controller TIC-170.003. The TIC-170.003 controller compares the actual temperature value against the remote setpoint temperature value and?varies the controller output (CO) accordingly?. The variable frequency drive VFD-170.009 is the controller output which modulates the speed of the combustion recirculation fan.

Combustion recirculation air entering the fire tube at the bottom is cooler than the air exiting the fire tube at the top, and is measured by temperature transmitter TT-170.004, which provides the process value (PV) for controller TIC-170.004.

Figure 13:
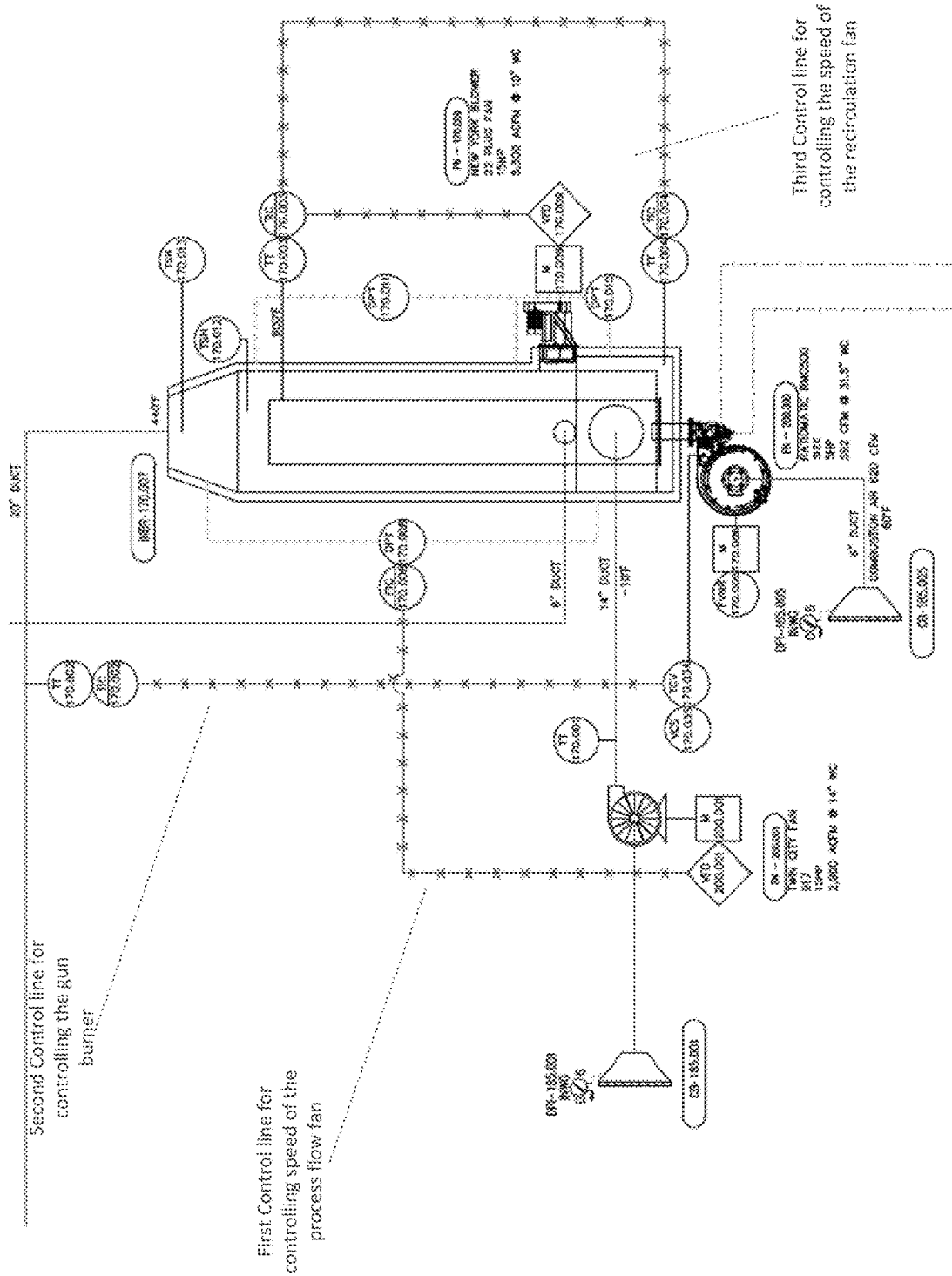
Figure 14:
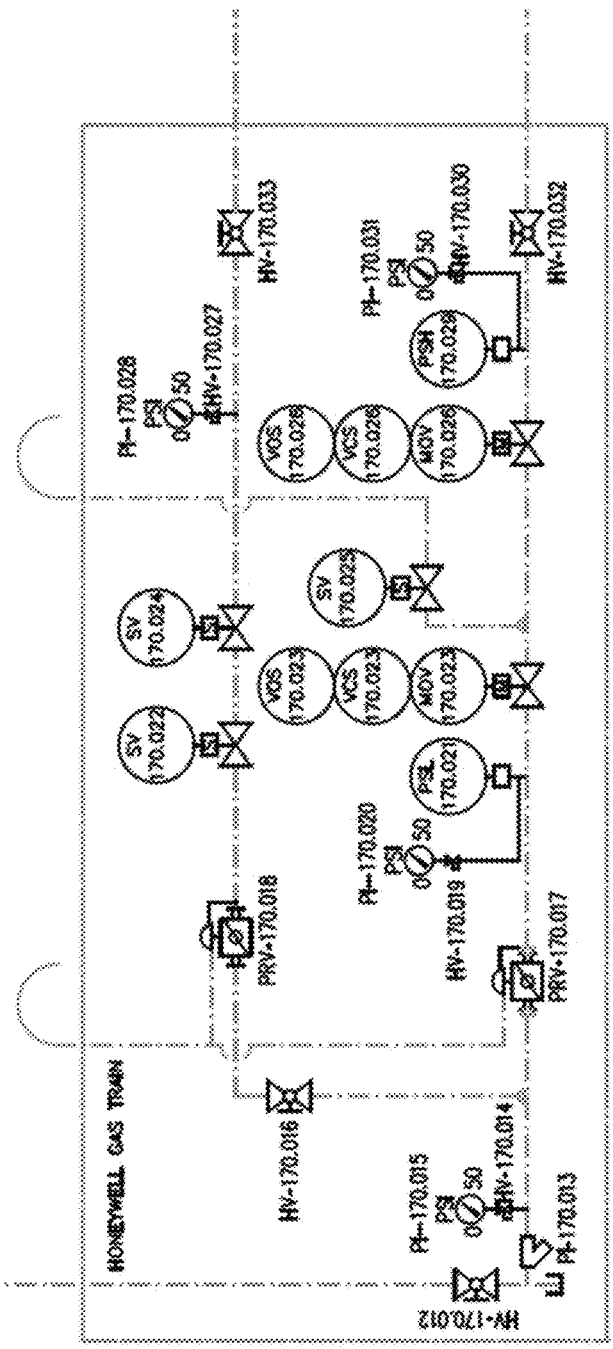
Figure 15:
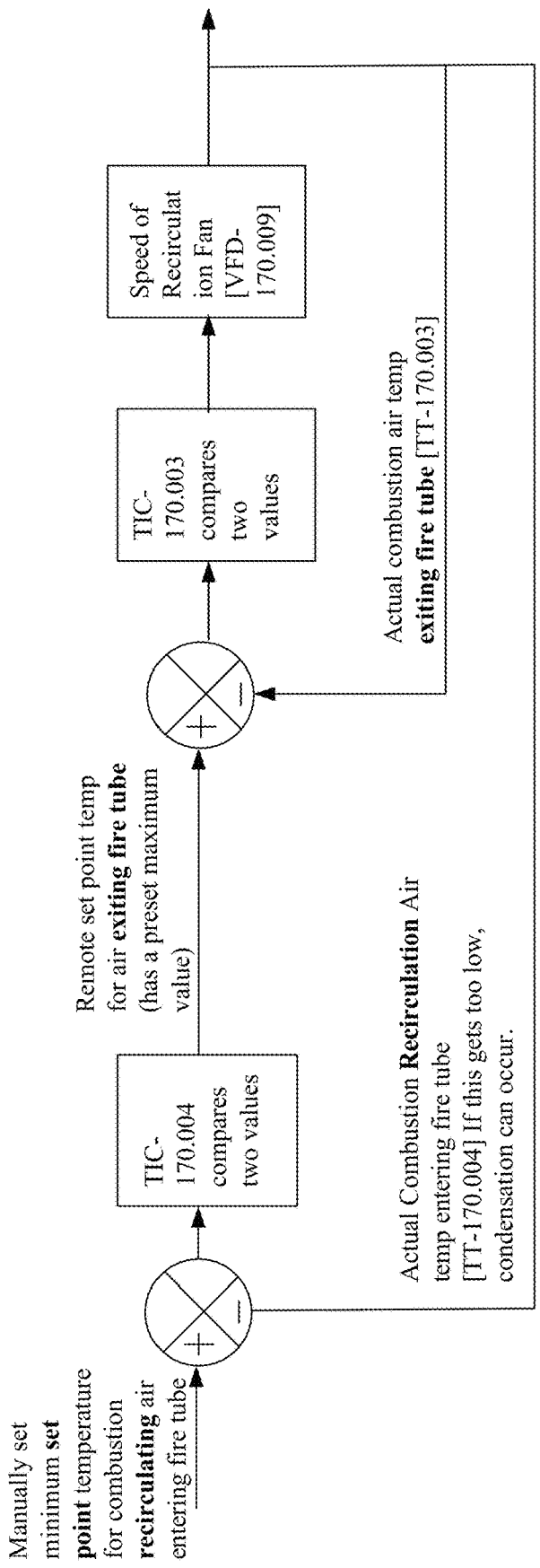

Controller TIC-170.004 has a manual minimum and maximum temperature setpoints (SP) that are entered into the controller by an operator. The minimum recirculation setpoint value is set so as to discourage condensation. The TIC-170.004 controller compares the actual combustion recirculation temperature value against the manually set minimum recirculation setpoint temperature value, and then varies the TIC-170.004 controller output up to the manually set maximum temperature setpoint (CO) accordingly. The TIC-170.004 controller output provides a temperature set point for the TIC-170.003 controller (See FIGS. 15 and 13).

In the event that the actual temperature value of the recirculation air approaches the minimum setpoint temperature value (thus approaching condensation), the TIC-170.004 controller varies the temperature setpoint of the TIC-170.003 controller downwardly, thus causing the speed of the combustion recirculation fan to increase. This is seen in the following examples, particularly the last example.

These cascading loops maintain a minimum and maximum recirculation air temperature to optimize efficiency.

Thus, it may be seen that the Recirculation Fan 50 is modulated to optimize the heat transfer within the indirect heater 10 at various fire rates. Other indirect heaters do not optimize the heat transfer and constantly run the recirculation fan(s) at full speed.

Various Scenarios Having Different Heating Rate

Here are three scenarios for a given Control Loop 3 setting, in which the TT-170.004 controller is set to maximum and minimum temperature setpoints of 900° F. and 200° F., respectively.

| MAXIMUM HEATING RATE | |
| --- | --- |
| TT-170.002 | 500° F. process air exiting the indirect heater |
| TCV-170.034 | 100% fire rate of the burner |
| VFD-170.009 | 100% speed of the combustion recirculation fan |
| TT-170.003 | 900° F. combustion air exiting fire tube |
| TT-170.004 | 254° F. combustion recirculation air entering fire tube |

| REDUCED HEATING RATE | |
| --- | --- |
| TT-170.002 | 450° F. process air exiting the indirect heater |
| TCV-170.034 | 89% fire rate of the burner |
| VFD-170.009 | 79% speed of the combustion recirculation fan |
| TT-170.003 | 900° F. combustion air exiting fire tube |
| TT-170.004 | 200° F. combustion recirculation air entering fire tube |

Compared to above, process air exit temp down to 450° F., fire rate of burner goes down, combustion recirculation fan down

| FURTHER REDUCED HEATING RATE | |
| --- | --- |
| TT-170.002 | 350° F. process air exiting the indirect heater |
| TCV-170.034 | 69% fire rate of the burner |
| VFD-170.009 | 90% speed of the combustion recirculation fan |
| TT-170.003 | 647° F. combustion air exiting fire tube |
| TT-170.004 | 200° F. combustion recirculation air entering fire tube |

Compared to above, process air exit temp further down to 350° F., fire rate of burner further down, combustion recirculation fan UP in order to maintain a 200° F. combustion recirculation temperature per the cascading control loop.
Once the system has reached steady state, the setpoint temperature of the exiting fire tube air is the same as the actual temperature reading of the exiting fire tube air.

Advantages

The primary advantages to the Dahmes Indirect Heater vs existing available options are: 1) cleanability, 2) ease of Inspection, 3) reduction in ductwork, 4) robust cylindrical design, and 5) fit in general arrangements.

Here follow advantages of the control system.

The use of a cascading loop control system to control the speed of a recirculating fan speed in order to keep lower temperatures on the combustion side from revealing condensation, while reducing energy costs by reducing recirculating fan speed within limits.

The concept above with another control system configured to control the fire rate of a combustion side gas burner based on the process air flow outlet temperature.

Either of the concepts above along with a third control system to control process air flow through the overall indirect heater, with process air inlet temperature and process air outlet temperature used to determine the average air density, and average air density and pressure drop is used to determine the process air flow through the Indirect Heater, the air flow being driven by a process flow inlet fan. Thus the control loop tends to vary the speed of the fan in a manner suitable to provide a desired ACFM (actual cubic feet per minute) of process airflow.

Here follow the advantages of the center firing tube.

A firing tube or plenum is required for high heat density gun style burners. These plenums are typically external and require a large amount of insulation to reduce the heat loss. The present indirect heater design places the 900° F. firing tube in the center of the heat exchanger, eliminating the need to insulate it which reduces the footprint and cost of the heat exchanger.

Placing the hot firing tube in the center of the heat exchanger and having a smaller footprint reduces the overall heat loss to the room, thus increasing the efficiency.

The round shape of the firing tube eliminates the need to reinforce it, which reduces the stress when thermocycling the heat exchanger.

The high air velocity in the firing tube promotes the mixing of the cool recirculation air with the combustion air. This reduces hot spots within the heat exchanger, which increases the heat transfer and the life of the heat exchanger.

This provides the most compact high efficiency air-to-air indirect heater in the industry.

This provides the most flexible shape in the industry. The round heat exchanger diameter vs. its length can be manipulated to provide the best fit for an installation.

The use of a round shell shape and tubes increases strength without weight, it also allows shorter, less complex transitions to round ductwork.

Combustion recirculation fan(s) speeds are controlled to optimize heat transfer while reducing flue gas heat loss and electricity to operate the fan(s) throughout the temperature/capacity range of the unit. Combustion recirculation fan speed modulation is also unique to this design.

Alternate Configurations

One, two, three, or four combustion recirculation fans configurations are possible. This allows optimizing the fan selection for the application.

Vertical or horizontal mounting is likewise available.

A secondary external shell and tube air to air heat exchange can be added to condense the exiting flue gas with the incoming combustion air to further increase efficiency.

CONCLUSION

Various modifications and variations can be made in the present invention without departing from the spirit or scope of the invention.

From the foregoing, it will be seen that this invention is one well adapted to obtain all the ends and objects herein set forth, together with other advantages which are obvious, and which are inherent to the structure.

It will be understood that certain features and sub combinations are of utility and may be employed without reference to other features and sub combinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention claimed is:

1. An apparatus for providing continuous heated process air to a spray dryer, said device transferring heat from combustion air to process air, said combustion air travelling along a combustion air path, and said process air travelling along a process air path, said apparatus comprising:
  A) an elongate center firing tube in the center of said apparatus, said elongate center firing tube having an inlet end and an outlet end, a longitudinal axis, and also having a cylindrical firing tube outer wall assembly defining a portion of said combustion air path;
  B) an elongate outer annular sleeve assembly having a longitudinal axis substantially parallel to said longitudinal axis of said elongate center firing tube, said elongate outer annular sleeve assembly facilitating heat transfer therein from combustion air to process air and including:
    1) A cylindrical annular sleeve outer wall assembly, said cylindrical annular sleeve outer wall assembly combining with said cylindrical firing tube outer wall assembly to define an annular heat transfer space therebetween, said annular heat transfer space having a first end and a second end and defining a part of said combustion air path and also defining a part of said process air path; and
    2) A heat transfer wall within said annular heat transfer space and intermediate said two paths such that said heat transfer wall defines a part of said combustion air path and also defines a part of said process air path, such that heat may be transferred through said heat transfer wall from said combustion air to said process air; and
  C) a redirection member configured to accept combustion air exiting said outlet end of said elongate center firing tube and to redirect said combustion air in an opposite direction into said inlet end of said annular heat transfer space of said elongate outer annular sleeve assembly,
  such that said combustion air path begins at said inlet end of said elongate firing tube, then passes out of said outlet end of said elongate firing tube, is then redirected in a substantially opposite direction into said first end of said annular heat transfer space, then passes through said annular heat transfer space, and then exits said second end of said annular heat transfer space, and
  such that said process air path enters through said second end of said annular heat transfer space and receives heat upon contact with said heat transfer wall before exiting said first end of said annular heat transfer space.

2. The apparatus as claimed in claim 1, wherein said elongate center firing tube passes through the center of said elongate outer annular sleeve assembly such that a length of said elongate outer annular sleeve assembly concentrically surrounds a length of said hot firing tube, and
  wherein said redirection member defines a cone-shaped surface.

3. The apparatus as claimed in claim 1, wherein said center firing tube has a substantially round outer diameter.

4. The apparatus as claimed in claim 1, wherein said elongate outer annular sleeve assembly has a substantially round outer diameter.

5. The apparatus as claimed in claim 1, wherein said elongate center firing tube and said elongate outer annular sleeve assembly are configured such that flows of process air and combustion air are in opposite directions within annular heat transfer space of said elongate outer annular sleeve assembly.

6. An apparatus for providing continuous heated process air to a spray dryer, said device transferring heat from combustion air to process air, said combustion air travelling along a combustion air path, and said process air travelling along a process air path, said apparatus comprising:
  A) an elongate center firing tube in the center of said apparatus, said elongate center firing tube having an inlet end and an outlet end, a longitudinal axis, and also having a cylindrical firing tube outer wall assembly defining a portion of said combustion air path;
  B) an elongate outer annular sleeve assembly having a longitudinal axis substantially parallel to said longitudinal axis of said elongate center firing tube, said elongate outer annular sleeve assembly facilitating heat transfer therein from combustion air to process air and including:
    1) A cylindrical annular sleeve outer wall assembly, said cylindrical annular sleeve outer wall assembly combining with said cylindrical firing tube outer wall assembly to define an annular heat transfer space therebetween, said annular heat transfer space having a first end and a second end and defining a part of said combustion air path and also defining a part of said process air path; and
    2) A plurality of elongate heat transfer tubes within said annular heat transfer space and having heat transfer tube walls intermediate said two paths such that said heat transfer tube walls define part of said combustion air path and also define part of said process air path, such that heat may be transferred through said heat transfer tube walls from said combustion air to said process air;
  C) a redirection member configured to accept combustion air exiting said outlet end of said elongate center firing tube and to redirect said combustion air in an opposite direction into said inlet end of said annular heat transfer space of said elongate outer annular sleeve assembly,
  such that said combustion air path begins at said inlet end of said elongate firing tube, then passes out of said outlet end of said elongate firing tube, is then redirected in a substantially opposite direction into said first end of said annular heat transfer space, then passes through the inside of said plurality of elongate heat transfer tubes within said annular heat transfer space, and then exits said second end of said annular heat transfer space, and
  such that said process air path enters through said second end of said annular heat transfer space and receives heat upon entering and contact with the inside of said plurality of elongate heat transfer tubes before exiting said first end of said annular heat transfer space.

7. The apparatus as claimed in claim 6, wherein said elongate center firing tube passes through the center of said elongate outer annular sleeve assembly such that a length of said elongate outer annular sleeve assembly concentrically surrounds a length of said hot firing tube, and
  wherein said redirection member defines a cone-shaped surface.

8. The apparatus as claimed in claim 6, wherein said center firing tube has a substantially round outer diameter.

9. The apparatus as claimed in claim 6, wherein said elongate outer annular sleeve assembly has a substantially round outer diameter.

10. The apparatus as claimed in claim 6, wherein said elongate center firing tube and said elongate outer annular sleeve assembly are configured such that flows of process air and combustion air are in opposite directions within annular heat transfer space of said elongate outer annular sleeve assembly.

11. The apparatus as claimed in claim 6, wherein said plurality of elongate heat transfer tubes each have longitudinal axes being substantially parallel to said longitudinal axes of said elongate center firing tube and said elongate outer annular sleeve assembly.

12. An apparatus for providing continuous heated process air to a spray dryer, said device transferring heat from combustion air to process air, said combustion air travelling along a combustion air path, and said process air travelling along a process air path, said apparatus comprising:

A) an elongate center firing tube in the center of said apparatus, said elongate center firing tube having an inlet end and an outlet end, a longitudinal axis, and also having a cylindrical firing tube outer wall assembly defining a portion of said combustion air path;

B) an elongate outer annular sleeve assembly having a longitudinal axis substantially parallel to said longitudinal axis of said elongate center firing tube, said elongate outer annular sleeve assembly facilitating heat transfer therein from combustion air to process air and including:

1) A cylindrical annular sleeve outer wall assembly, said cylindrical annular sleeve outer wall assembly combining with said cylindrical firing tube outer wall assembly to define an annular heat transfer space therebetween, said annular heat transfer space having a first end and a second end and defining a part of said combustion air path and also defining a part of said process air path; and 2) A plurality of elongate heat transfer tubes within said annular heat transfer space and having heat transfer tube walls intermediate said two paths such that said heat transfer tube walls define part of said combustion air path and also define part of said process air path, such that heat may be transferred through said heat transfer tube walls from said combustion air to said process air;

C) a redirection member configured to accept combustion air exiting said outlet end of said elongate center firing tube and to redirect said combustion air in an opposite direction into said inlet end of said annular heat transfer space of said elongate outer annular sleeve assembly, D) a recirculation apparatus which accepts at its inlet a recirculated portion of combustion air from said second end of said annular heat transfer space, and inserts said recirculated portion into said inlet end of said elongate center firing tube to be combined with other combustion air entering said inlet end of said elongate center firing tube, such that said combustion air path begins at said inlet end of said elongate firing tube, then passes out of said outlet end of said elongate firing tube, is then redirected in a substantially opposite direction into said first end of said annular heat transfer space, then passes through the inside of said plurality of elongate heat transfer tubes within said annular heat transfer space, and then exits said second end of said annular heat transfer space, and such that said process air path enters through said second end of said annular heat transfer space and receives heat upon entering and contact with the inside of said plurality of elongate heat transfer tubes before exiting said first end of said annular heat transfer space, and such that said recirculated portion of combustion air from said second end of said annular heat transfer space is inserted into said inlet end of said elongate center firing tube to be combined with other combustion air entering said inlet end of said elongate center firing tube.

13. The apparatus as claimed in claim 12, wherein said elongate center firing tube passes through the center of said elongate outer annular sleeve assembly such that a length of said elongate outer annular sleeve assembly concentrically surrounds a length of said hot firing tube, and wherein said redirection member defines a cone-shaped surface.

14. The apparatus as claimed in claim 12, wherein said center firing tube has a substantially round outer diameter.

15. The apparatus as claimed in claim 12, wherein said elongate outer annular sleeve assembly has a substantially round outer diameter.

16. The apparatus as claimed in claim 12, wherein said elongate center firing tube and said elongate outer annular sleeve assembly are configured such that flows of process air and combustion air are in opposite directions within annular heat transfer space of said elongate outer annular sleeve assembly.

17. The apparatus as claimed in claim 12, wherein said plurality of elongate heat transfer tubes each have longitudinal axes being substantially parallel to said longitudinal axes of said elongate center firing tube and said elongate outer annular sleeve assembly.

18. The apparatus as claimed in claim 12, wherein said recirculation apparatus includes a variable speed fan configured to vary the amount of recirculated portion of combustion air being inserted into said inlet end of said elongate center firing tube.

19. The apparatus as claimed in claim 12, wherein said a recirculation apparatus includes a variable speed fan configured to vary the amount of recirculated portion of combustion air being inserted into said inlet end of said elongate center firing tube, said variable speed fan being controlled dependent upon the temperature of said recirculated portion of combustion air.

* * * * *